Jan. 16, 1923.　　　　　A. R. MEISTER.　　　　　1,442,352.
MOTOR VEHICLE.
FILED JUNE 21, 1921.　　　　3 SHEETS—SHEET 1.
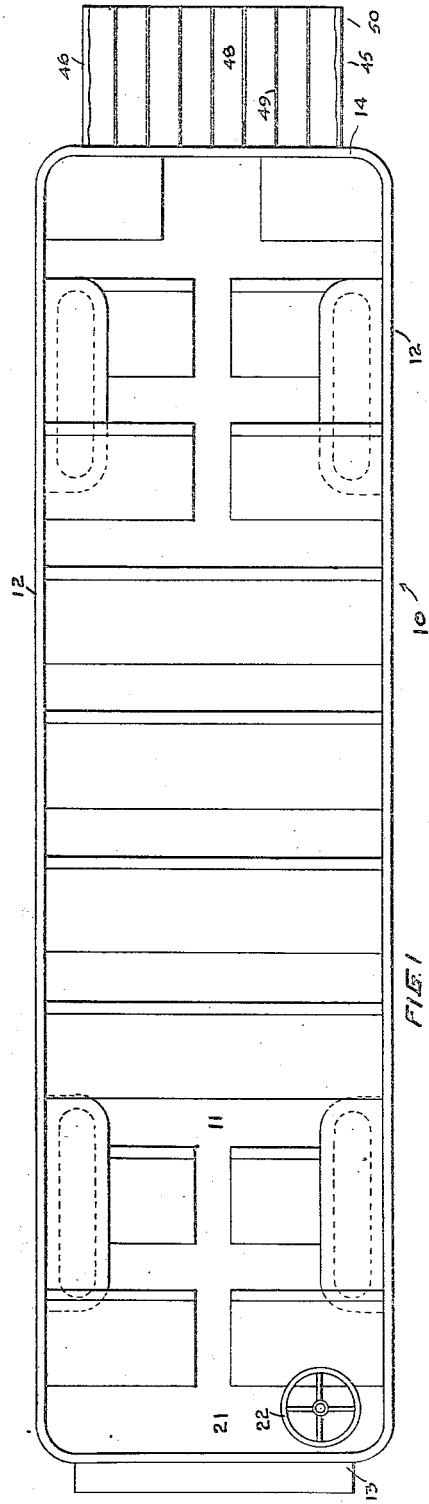
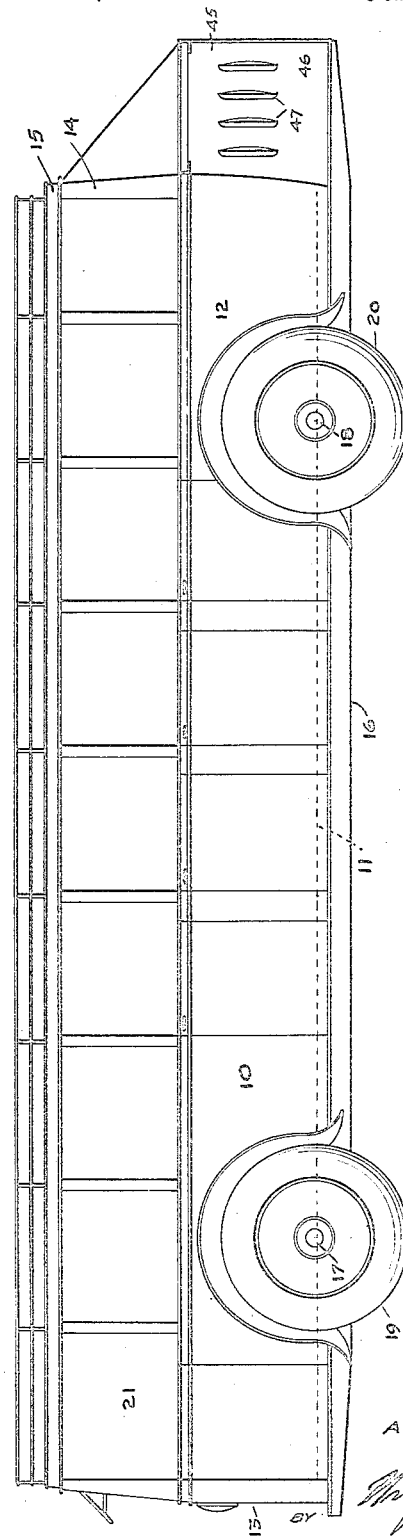
INVENTOR
A. R. MEISTER
ATT'YS.

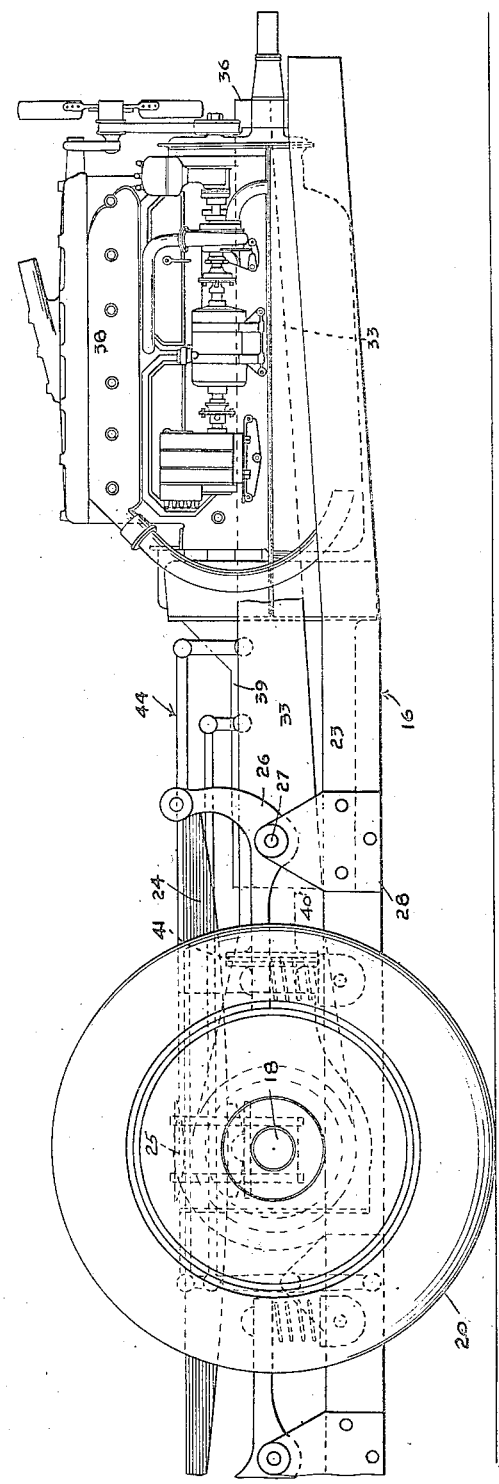

Jan. 16, 1923.
A. R. MEISTER.
MOTOR VEHICLE.
FILED JUNE 21, 1921.
1,442,352.
3 SHEETS—SHEET 3.
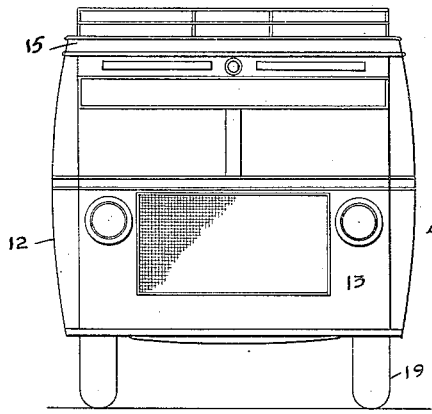
FIG. 4
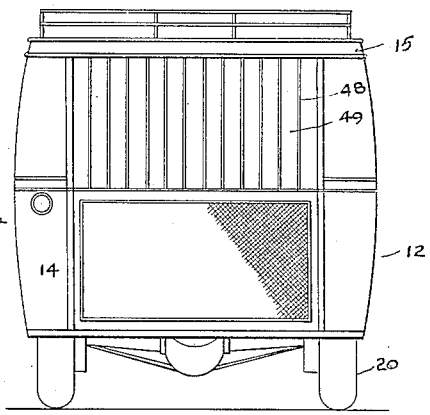
FIG. 5
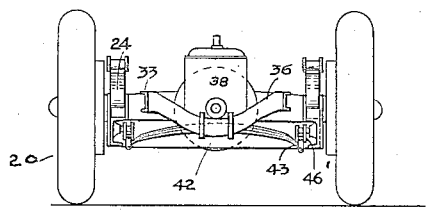
FIG. 9
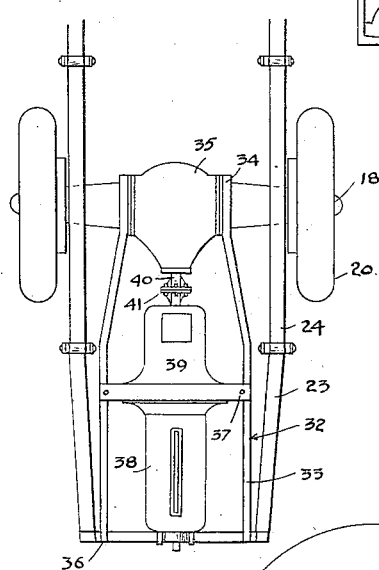
FIG. 6
FIG. 7
FIG. 8
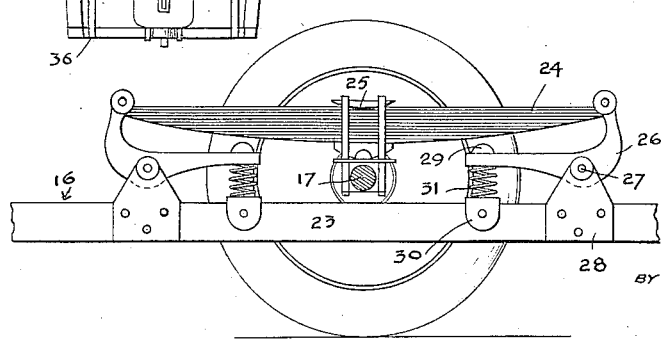
INVENTOR
A. R. MEISTER
BY
ATT'YS.

Patented Jan. 16, 1923.

1,442,352

UNITED STATES PATENT OFFICE.

ALBERT R. MEISTER, OF SACRAMENTO, CALIFORNIA.

MOTOR VEHICLE.

Application filed June 21, 1921. Serial No. 479,220.

*To all whom it may concern:*

Be it known that I, ALBERT R. MEISTER, a citizen of the United States, residing at Sacramento, in the county of Sacramento and State of California, have invented new and useful Improvements in Motor Vehicles, of which the following is a specification.

This invention relates to improvements in motor vehicles and has special regard to motor busses, motor railway cars of large construction, the primary object being to provide maximum passenger space and to dispose the body as low as possible so as to lower the center of gravity, this being accomplished by a novel frame suspension arrangement and special motor mounting and drive construction wherein the motor and drive means are located rearward of the rear axle and for the most part below the body and none of the driving mechanism is disposed between the axles, thus permitting the floor of the body between the axles to be located closer to the ground.

Another object is to provide a novel, simply constructed and compact motor and drive unit, wherein these mechanisms are mounted in a sub-frame of special construction, and said frame is attached to the main frame in a novel manner rearwardly of the rear axle, the entire unit being readily detachable, of strong durable construction and comparatively inexpensive.

A further object is to provide a novel means of spring suspension for securing the sub-frame to the rear axle and main frame whereby a maximum cushioning and spring action is provided.

The invention possesses other advantages and features some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawings:—

Figure 1 is a top plan view of a motor vehicle constructed in accordance with the present invention.

Figure 2 is a side elevation of the vehicle.

Figure 3 is an enlarged fragmentary side elevation of the rear portion of the frame with the body removed particularly showing the motor and drive unit.

Figure 4 is a front elevation of the vehicle.

Figure 5 is a rear elevation of the vehicle.

Figure 6 is a fragmentary top plan view of the mechanism shown in Figure 3.

Figure 7 is a rear elevation of the motor and drive unit shown in Figures 3 and 6.

Figure 8 is an enlarged fragmentary vertical section, showing in detail the front and rear wheel spring suspension means.

Figure 9 is an enlarged fragmentary end elevation of the rear of a vehicle on one side, showing the manner of connecting the sub-frame with the main frame.

The present embodiment of the invention as shown in the accompanying drawings relates to highway or road vehicles but it is obvious that the same construction may be carried out in railway cars, it only being necessary to provide well known expedients to effect the conversion of the road vehicle into a rail vehicle.

In carrying out the invention a vehicle body 10 comprising a floor 11, sides 12, ends 13 and 14 and roof 15 is mounted upon a frame or chassis 16 which latter is underslung upon axles 17 and 18 supported by front wheels 19 and rear wheels 20. The floor of the body is close to the ground being preferably spaced from 12 to 17 inches above the same from points between the axles, whereby the center of gravity of the vehicle is comparatively low and the entire area between the axles may be in a common plane suitable for seating space.

The body extending beyond the front axles 17 to provide a driver's compartment 21 in which the steering gear 22 and other operating mechanism (not shown) will be located, all, in front of the front axles and within said compartment. The rear end of the body extends well beyond or in other words overhangs the rear axle 18 and beneath and extending only in part into this rear end is the motor and drive unit located rearwardly of the rear axle.

The front and rear axles extend above and across the longitudinal bars 23 of the frame 16 and both have the usual leaf springs 24 of the semi-elliptic type secured thereto by clamping means 25, the springs being mounted with the ends thereof disposed forwardly and rearwardly of the axles and over said bars 23. Pivoted at their ends to the ends of the springs are bell-crank shackles 26 in turn pivoted intermediate of their ends as at 27 to brackets 28 on the bars 23. The other ends of the bell cranks support rubber bumpers 29 which are adapted to engage to the springs 24. Expansion springs 31 are mounted between these ends and the frame with their ends engaging and secured to the shackles 26 and holders 30 respectively. The shackles 26 will rock against the action of the springs 31 upon flexing of the main spring 24.

The motor and drive unit is mounted upon a sub-frame 32 of rectangular outline, which frame comprises longitudinally extending side bars 33 secured as at 34 to opposite sides of the differential housing 35 of the rear axle 18. The side bars 33 extend rearwardly from the rear axle close to but spaced from the inner sides of said bars 23 of the frame and at their rear ends are joined by a downwardly bowed cross piece 36. This with other suitable cross pieces 37 constitute the base or cradle for supporting the motor 38. Change speed mechanism 39 is supported by the cross bar 37 and may be suitably braced in the sub-frame. A drive shaft 40 extends from said mechanism 39 into the differential housing 35 and has the customary universal joint 41. The cross piece 36 is secured centrally of its ends to a semi-elliptic spring 42 which latter extends transversely of the frame and is secured at its free ends by pivot shackles, or links 43 to the adjacent rear ends of the frame bars 23. In this way the sub-frame is directly connected with the main frame by spring suspension means which will permit of a rocking motion laterally or transversely also longitudinal motion, of the sub-frame, also a vertical motion at the forward end thereof whereby the sub-frame is capable of free movement relative to the main frame so as to readily absorb and take up jars transmitted to the axles and wheels. The attachment of the sub-frame at the front and rear ends thereof is such that said frame is rigidly incorporated with the main frame and rear axles whereby possibility of derangement thereof is prevented and reliability of operation is insured. It will therefore be apparent that the motor and drive unit including the rear axle and drive wheel is connected by spring suspension means with the main frame and located entirely rearwardly of the front portions of the rear axle. Suitably operating means generally designated, 44 is connected with the motor and change speed mechanism and extends along the lower side of the body to the operating means (not shown) in the compartment 21. This means being in the form of rods and levers takes up little or no room under the front of the body and will permit of location of the body within 12 inches of the ground from axle to axle, with the upper side of the floor substantially 17 inches from the ground.

Preferably the engine or motor is located rearwardly of the rear end wall of the body and is in the form of a rectangular housing 70 45 provided in the side walls 46 thereof with vents 47 to allow atmospheric air to enter for cooling the motor. The upper wall of the housing is formed of a plurality of spaced slats or boards 48 which serve as a baggage supporting shelf, the spacing of said boards providing cooling vents 49. At opposite ends of the top walls there may be provided end walls 50 to hold the baggage in place upon the slats or boards 49. The front wall 50 of the housing may be in the form of a frame with a foraminous or screen body and is readily removable to permit of access to the motor. The construction of the body may be worked out along various lines as to seating arrangement, passage ways or aisles and need not be described in detail.

It will be seen that by disposing the motor and drive unit outside of the body proper rearwardly of the rear axle and for the most part below the floor of the body a space is made for maximum seating capacity and to lower the center of gravity of the vehicle as a whole. The arrangement also tends to simplify the construction, lessen the cost of building and generally improve the construction, operation and appearance of the vehicle as will be evident from the foregoing and illustrated in the accompanying drawings.

As particularly shown in Fig. 9, the shackles 43 are pivoted to a member 44' so as to swing transversely and the member 44' is pivoted as at 45' to a shackle 46' so as to swing or move forward and rearward or longitudinally. The shackle 46' is pivoted as at 47' to a bracket 48' carried by the main frame bars and is thereby also permitted to swing forward and rearward longitudinally of the main frame.

This construction allows for the relative longitudinal movement of the sub-frame and this movement is brought about due to the use of the rocker arm shackles 26.

When a bump is encountered by the wheels, the axles will move slightly bodily lengthwise of the main frame as well as up and down due to the arcuate movement of the ends of the spring 24 when connected with shackles 26.

In the rear axle this longitudinal movement will be transmitted to the sub-frame, the said movement of which latter being permitted by the shackle arrangement as shown in Fig. 9. Thus the sub-frame is capable of universal movement relative to the main frame and a great deal of the road shocks and jars and strains will be taken up before being transmitted to the vehicle frame and body. The springs 31 act as snubbers to prevent quick and sudden up movement of the main frame and body incident to encountering road bumps and act effectively as shock absorbers.

I claim:—

1. A motor vehicle of the character described comprising a body, a frame for supporting said body, front and rear axles attached to said frame, wheels supporting said axles, a sub-frame connected with the first named frame and rear axle and disposed in a plane above the first named frame and rearwardly of the rear axle and a combined motor and drive unit operatively associated with the sub-frame and rear axle and disposed entirely rearwardly of said rear axle.

2. A motor vehicle comprising a main frame, front and rear axles attached to the frame, wheels supporting the axles, said frame extending rearwardly beyond the rear axle, a sub-frame attached to the rear axle and extending rearwardly therefrom, means of spring suspension between the two frames and a combined motor and drive unit supported by the sub-frame.

3. A motor vehicle comprising a main frame, front and rear axles attached to the frame, wheels on the axles, said frame extending rearwardly beyond the rear axle, a sub-frame supported at one end by the rear axle, a spring connecting the other end of the sub-frame and the rear end of the main frame and a combined motor and drive unit supported by said sub-frame.

4. A motor vehicle comprising a main frame, front and rear axles attached to the frame, wheels supporting the axles, said frame extending rearwardly beyond the rear axle, a sub-frame attached to the rear axle and extending rearwardly therefrom, means of spring suspension between the two frames and a combined motor and drive unit supported wholly in the sub-frame, and means of spring suspension for supporting the main frame beneath the plane of the rear axle.

5. A motor vehicle comprising a main frame, front and rear axles attached to the frame, wheels supporting the axles, said main frame extending rearwardly of the rear axle, a sub-frame attached at one end to and extending rearwardly from said rear axle, combined motor and drive means supported within a sub-frame, a spring secured to the sub frame and shackles pivotally connected with the frame and said spring.

6. A motor vehicle comprising a main frame, front and rear axles attached to the frame, wheels supporting the axles, said frame extending rearwardly beyond the rear axle, a sub-frame attached to the rear axle and extending rearwardly therefrom, a vehicle spring attached to the sub-frame, means for operatively connecting the vehicle spring to the main frame arranged to permit longitudinal, transverse, and vertical movement of the sub-frame relative to the main frame, a combined motor and drive unit supported wholly in the sub-frame and operatively associated with the rear axle and means of spring suspension for supporting the main frame beneath the frame of the rear axle.

7. A motor vehicle comprising a main frame, front and rear axles attached to the frame, wheels supporting the axles, said frame extending rearwardly beyond the rear axle, a sub-frame attached to the rear axle and extending rearwardly therefrom, a vehicle spring attached to the sub-frame, means for operatively connecting the ends of the vehicle spring to the ends of the main frame arranged to permit longitudinal, transverse, and vertical movement of the sub-frame relative to the main frame, a combined motor and drive unit supported wholly in the sub-frame and operatively associated with the rear axle and means of spring suspension for supporting the main frame beneath the frame of the rear axle, said last named means comprising springs secured intermediate their ends to the rear axle, rocker arms pivoted to the main frame intermediate their ends and at their upper ends to the ends of the springs, and expansion springs connected at their ends with the other ends of the rocker arms and with the main frame.

ALBERT R. MEISTER.